United States Patent
Kaler

(10) Patent No.: US 7,984,316 B2
(45) Date of Patent: Jul. 19, 2011

(54) SOLID STATE DISK WITH HOT-SWAPPABLE COMPONENTS

(76) Inventor: Paul Kaler, Houston, TX (US)

( * ) Notice: Subject to any disclaimer, the term of this patent is extended or adjusted under 35 U.S.C. 154(b) by 1562 days.

(21) Appl. No.: 11/066,840

(22) Filed: Feb. 24, 2005

(65) Prior Publication Data

US 2005/0188149 A1    Aug. 25, 2005

Related U.S. Application Data

(60) Provisional application No. 60/547,217, filed on Feb. 24, 2004.

(51) Int. Cl.
*G06F 1/26* (2006.01)
(52) U.S. Cl. ......... 713/340; 713/300; 710/302; 711/100
(58) Field of Classification Search .......... 713/300, 713/340; 710/302; 711/100
See application file for complete search history.

(56) References Cited

U.S. PATENT DOCUMENTS

| | | | | |
|---|---|---|---|---|
| 5,535,399 | A | * | 7/1996 | Blitz et al. .................. 714/6 |
| 2003/0135729 | A1 | * | 7/2003 | Mason et al. ............... 713/2 |
| 2005/0097308 | A1 | * | 5/2005 | Holzmann .................. 713/1 |

OTHER PUBLICATIONS

ESE50 SDI Solid State Disk. Service Guide. Digital Equipment Corporation, Jun. 1993.*
ESE50 SDI Solid State Disk. User Guide. Digital Equipment Corporation, Jun. 1993.*

* cited by examiner

*Primary Examiner* — Thuan N Du
(74) *Attorney, Agent, or Firm* — Robert C. Strawbrich, Esq.

(57) ABSTRACT

A solid state disk (SSD) device includes a non-volatile storage module (NVSM), a secondary power source coupled to power inputs of the SSD, a volatile memory (VM), a controller in communication with the NVSM and the VM. The controller is operable in a (re)populate mode to (re)populate data stored in the NVSM to the VM when primary power is initially applied to power inputs of the SSD and further operable in a primary power on mode to replicate data to the NVSM that was written to the VM in response to received I/O requests while primary power is applied to the power inputs of the SSD. The secondary power source can be decoupled from the power inputs of the SSD while the controller is operating in either the (re)populate mode or the primary power on mode.

24 Claims, 11 Drawing Sheets

SOLID STATE DISK WITH HOT-SWAPPABLE COMPONENTS

BACKGROUND

This application claims the benefit of U.S. Provisional Application No. 60/547,217, filed Feb. 24, 2004.

Non-volatile storage is essential to virtually all computer systems, from notebooks to desktops to large data centers employing clusters of servers. Non-volatile storage serves as a secure data repository which prevents data loss in the event of an unexpected interruption in primary power. Some common forms of non-volatile storage are packaged as non-volatile storage modules (NVSM) that can employ a magnetic disk (under control of a magnetic disk drive), flash memory components, or even magnetic tape (under control of a magnetic tape drive) as the non-volatile storage medium for the module.

One of the downsides of non-volatile storage is that it is relatively slow to access compared to volatile forms of memory such as DRAM (Dynamic Random Access Memory). Thus, virtually all computer systems also include volatile memory (VM) in which to temporarily store data for faster access. Typically, code for executing application programs and data recently used by active applications are stored to and retrieved from the non-volatile storage and stored in the VM for faster access.

Recently, a hybrid form of storage has been developed that seeks to provide the persistence of non-volatile storage but an access speed comparable to VM. This form of storage is commonly known as a solid state disk (SSD). The SSD typically includes DRAM or some other form of VM and an NVSM that employs a non-volatile storage medium such as a magnetic disk, flash memory or the like. The SSD also typically includes a back-up or secondary power source such as a battery. The internal battery supply is used in the event that primary power is lost, with sufficient capacity to continue refreshing the VM while all of the data stored therein is saved off to the NVSM. Once primary power is restored, the data can be retrieved and stored back into the VM for access by the host computer system to which it is coupled.

BRIEF DESCRIPTION OF THE DRAWINGS

For a detailed description of embodiments of the invention, reference will now be made to the accompanying drawings in which.

NOTATION AND NOMENCLATURE

Figure 1:
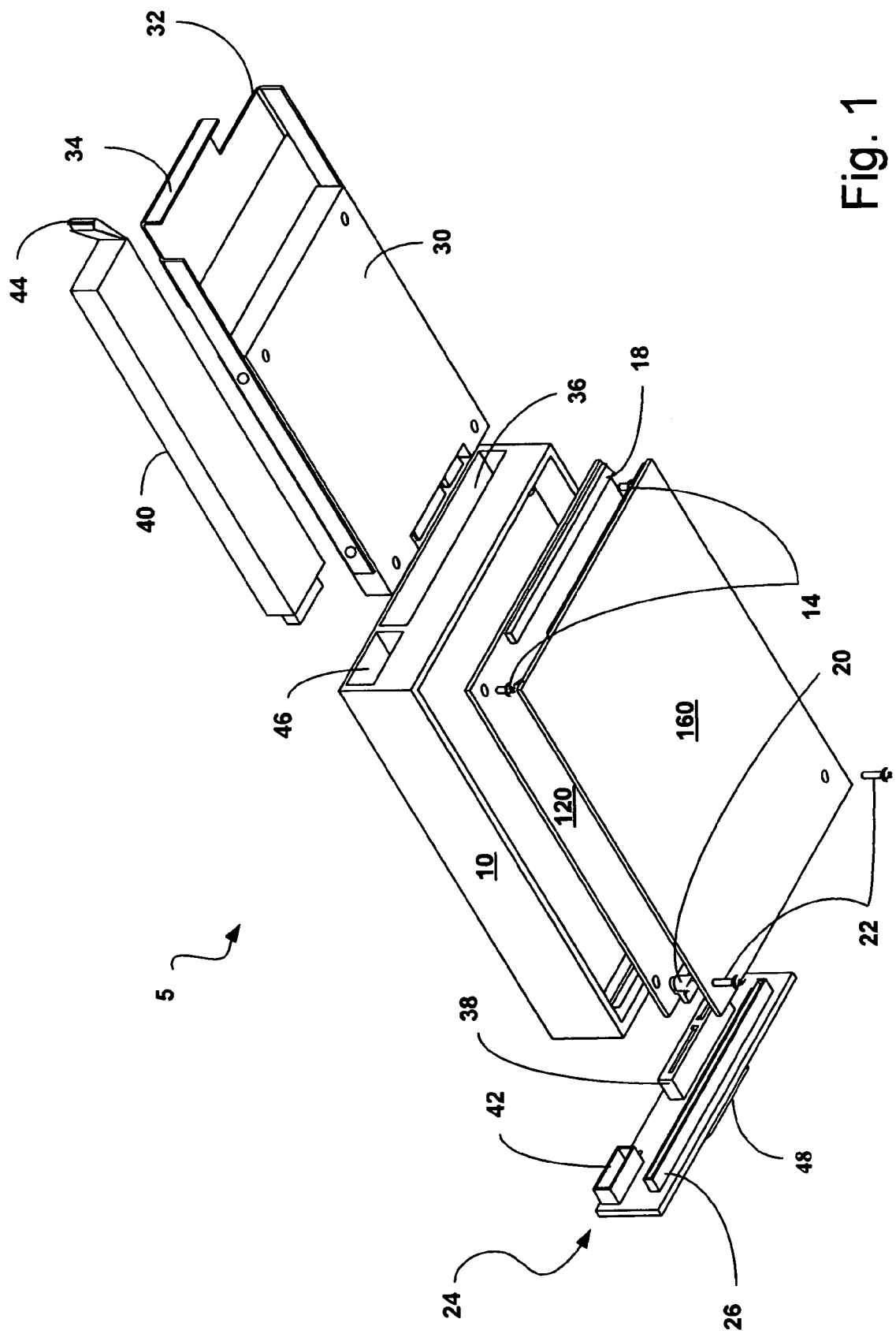
FIG. 1 is an assembly diagram with a side perspective view from slightly underneath the assembly that illustrates various features of a solid state disk (SSD), including some features by which the SSD operates in accordance with an embodiment of the present invention.

Certain terms are used throughout the following description and in the claims to refer to particular features, apparatus, procedures, processes and actions resulting therefrom. Those skilled in the art may refer to an apparatus, procedure, process, result or a feature thereof by different names. This document does not intend to distinguish between components, procedures or results that differ in name but not function. Moreover, those of skill in the art will recognize that the procedural flow diagrams illustrating embodiments of the invention are intended solely to illustrate the general functionality of the invention are not intended to depict a strict functional sequence. For example, those of skill in the art will recognize that certain of the processes run in parallel with one another or are susceptible to being run in a different order than that depicted by the flow diagrams disclosed herein. Thus, the functional diagrams are only intended to communicate the general functionality of the disclosed invention and are but one possible representation of that functionality. Finally, in the following discussion and in the claims, the terms "including" and "comprising" are used in an open-ended fashion, and thus should be interpreted to mean "including, but not limited to . . . . "

Detailed Description

The following discussion is directed to various embodiments of the invention. Although one or more of these embodiments may be preferred, the embodiments disclosed should not be interpreted as, or otherwise be used for limiting the scope of the disclosure, including the claims, unless otherwise expressly specified herein. In addition, one skilled in the art will understand that the following description has broad application, and the discussion of any particular embodiment is meant only to be exemplary of that embodiment, and not intended to intimate that the scope of the disclosure, including the claims, is limited to that embodiment.

To ensure reliability of an SSD, it is critical that sufficient battery power is maintained to accomplish the backing up of the data in the VM of the SSD to the NVSM. To ensure a minimum down time after a loss of power, it is also desirable to minimize the time necessary to repopulate the VM from the NVSM.

Consistent with minimizing system and component downtime as well as increasing system reliability, it is further desirable to make the internal secondary power source as well as the NVSM hot-swappable (i.e. capable of being removed and replaced while power is maintained to the SSD and without interruption of the SSD operation). This makes it possible to avoid taking the SSD offline to perform the swap, which otherwise necessitates a boot-up of the SSD once the swap is accomplished. Facilitating regular maintenance also improves reliability because a faulty secondary power source or storage medium in the NVSM can, worst case, prevent backing up of the data if primary power is lost. Without hot-swap capability, a faulty NVSM further complicates the process of preserving the volatile data prior to powering down the SSD to swap out the faulty component. Making these components hot-swappable also renders the task of replacing them simple enough even for personnel not necessarily familiar with the technical details of the components.

Finally, it is desirable to include the foregoing features, particularly the hot-swap capability, into SSD devices that meet the entire range of form factors currently in use or in development. This can be especially true of the smaller end of the form factor range (e.g. 3.5 and 2.5 inch width) given the persistent demand for reducing the size of computer systems and their components.

Figure 2:
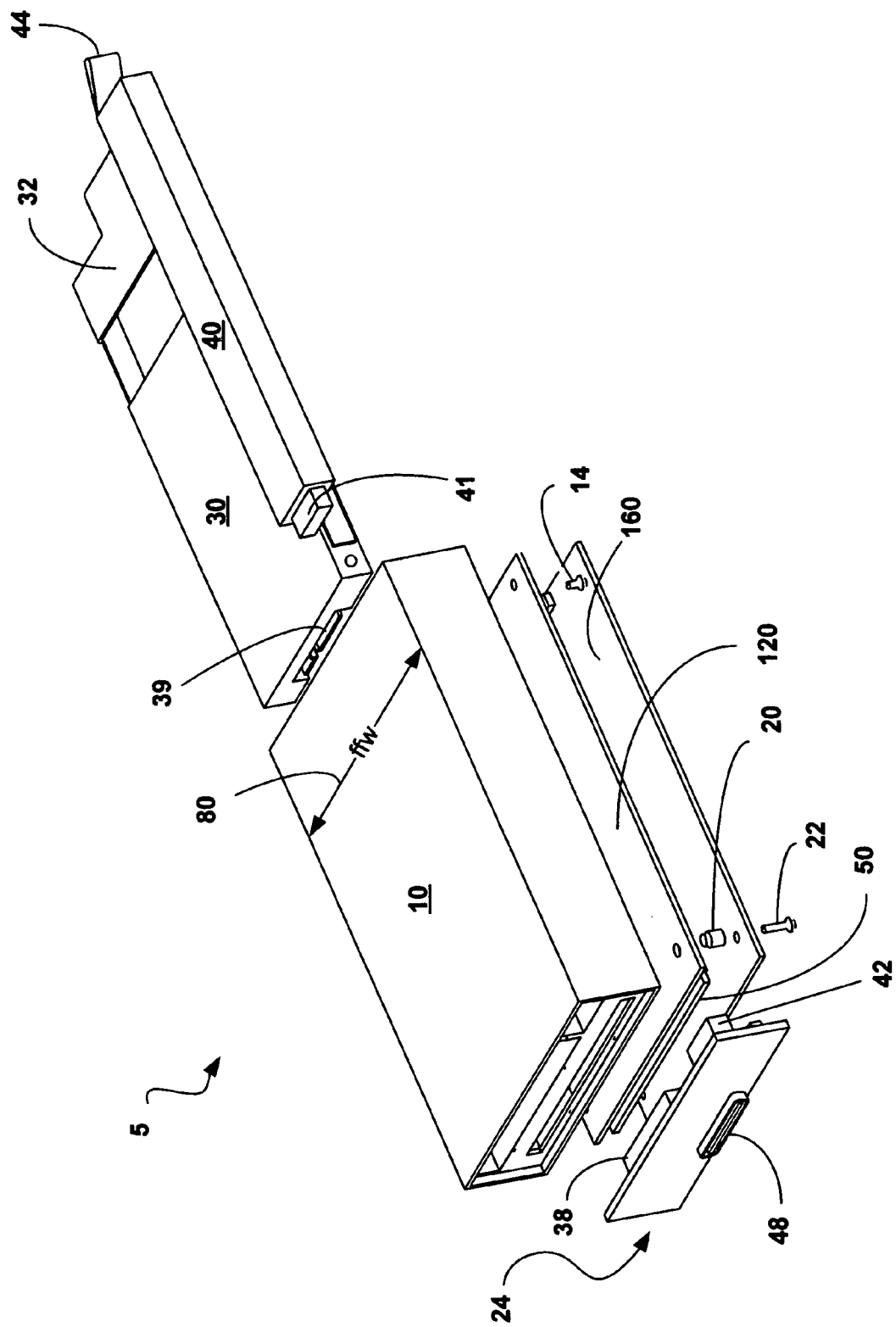
FIG. 2 is an assembly diagram with a side perspective view from slightly above the assembly that illustrates various features of a solid state disk (SSD), including some features by which the SSD operates in accordance with an embodiment of the present invention.

FIGS. 1 and 2 are mechanical assembly diagrams that illustrate two views of various features of a solid state disk (SSD) 5 that may be used to implement embodiments of the invention. SSD 5 may be coupled to a host computer system (not shown) via I/O connector 48 of junction board 24 either directly, or indirectly through one or more intermediate devices such as a storage array controller or the like. In an embodiment, the SSD 5 includes an SSD controller 12, FIG. 3 that coordinates and controls the primary operation of the SSD 5 and can comprise several components mounted on a PCB (printed circuit board) illustrated as controller board 120. The SSD 5 further includes a non-volatile storage module (NVSM) 30 that can include a non-volatile storage medium such as a magnetic disk, flash memory, magnetic tape or the like. The SSD 5 further includes a volatile memory (VM) 16 that can be comprised of volatile memory media components such as SRAM (static random access memory) or dynamic random access memory (DRAM) mounted on VM board 160. The term DRAM should be interpreted for purposes of this disclosure to include any one of a number of DRAM variations such as SDRAM (synchronous DRAM), DDR (double data rate SDRAM), DDR2 (double data rate 2 SDRAM), and equivalents thereof. SSD 5 also includes a secondary power source 40, typically in the form of a rechargeable battery, the primary purpose of which is to provide sufficient power for the SSD 5 to save volatile data stored in the VM 16 to the NVSM 30 after a loss of primary power.

The controller board 120 can be communicatively coupled to the VM board 160 through a connector such as sandwich connector 18. The controller board 120 can be coupled to the host computer system through the coupling of a male backplane edge connector 50 to female edge connector 26 of junction board 24 as illustrated. NVSM 30 and secondary power source 40 are also coupled to the controller board through coupling their respective connectors 39 and 41 to the female connectors 38 and 42 respectively of junction board 24.

In an embodiment, to facilitate hot-swapping of the NVSM 30 and the secondary power source 40, they are located substantially within the same plane and within compartments 46 and 36 of housing 10 as illustrated. They are each individually accessible from the front of the SSD 5 and can be isolated from the controller 120 and VM 160 boards which are located within housing 10 below the compartments 46 and 36. In an embodiment, NVSM 30 is attached to bracket member 32, which facilitates insertion of the NVSM into compartment 36. Bracket member 32 includes grip 34 to facilitate pulling the NVSM 30 from compartment 36 and female edge connector 38. Those of skill in the art will recognize that the male connector of NVSM 30 and female edge connector will be implemented in accordance with typical standards for hot-swapping where certain pins (such as a power and ground) are made before others upon insertion, and certain pins are broken last upon removal (such as power and ground). In an embodiment, secondary power source 40 includes a pull tab 44 coupled to it for providing a means by which it can be pulled from the compartment 46 and the female connector 42. Other equivalent techniques by which to provide a grip to power source 40 and NVSM 30 may also be employed.

In an embodiment, controller board 120 is mounted to the underside of housing 10. Memory board 160 is coupled to controller board 120 through connector sandwich connector 18. Spacer 20 can serve to even the stand-off between memory board 160 and controller board 120 on the end opposite that of the connector 18. Screws 22 or an equivalent fastener secure memory board 160 and controller board 120 to housing 10 through spacer 20, and screws 14 or an equivalent fastener secure memory board 160 and controller board 120 to housing 10 at the connector 18 end of the boards. Junction board 24 is coupled to housing 10 with screws or an equivalent fastener (not shown).

In an embodiment, secondary power source 40 is approximately 0.85 inches wide by approximately 0.374 inches high and compartment 46 is approximately 0.858 inches wide by approximately 0.384 inches high. NVSM 30 is approximately the size of a standard 2.5 inch form factor hard disk drive. NVSM 30 and its bracket member 32 slide into compartment 36, which is approximately 2.84 inches wide by approximately 4 inches high. Thus, housing 10 is able to fit a standard 3.5 inch hard disk drive format at approximately 4 inches wide 80, 1 inch high and 5.75 inches long.

As previously mentioned, secondary power source 40 is typically a rechargeable battery, but could be any type of rechargeable power source known to those of skill in the art to be suitable for this purpose. In an embodiment, the secondary power source 40 is a rechargeable battery and can be implemented using a number of technologies and materials. For example, the chemical composition of the battery can be for example, Li-ion (lithium ion), NiMH (nickel metal hydride), NiCAD (nickel cadmium), or any other suitable composition. The battery can be implemented in a number of ways. In an embodiment, a plastic substrate multi-layer stacked Lithium Ion battery can be used. This enables the footprint to be custom designed to fit into compartment 46 thus providing greater reliability, efficiency, and energy density.

Figure 3:
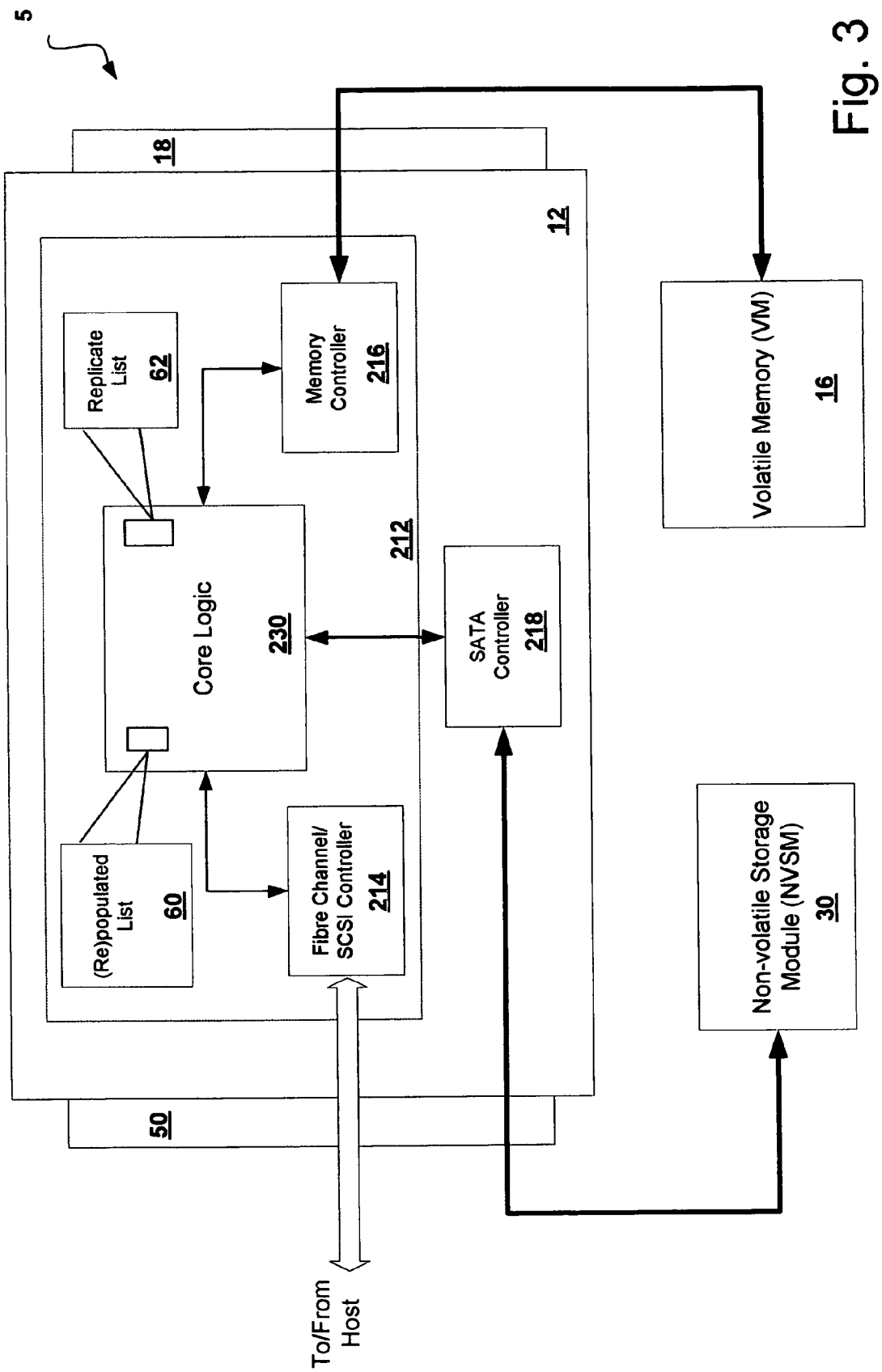
FIG. 3 is a block diagram that illustrates various features of a solid state disk (SSD), including some features by which the SSD operates in accordance with an embodiment of the present invention.

FIG. 3 illustrates a functional block diagram of an embodiment of SSD 5 including some of the primary components discussed above in reference to FIGS. 1 and 2. As illustrated, SSD controller 12 may further include a core logic block 230 that communicates with the host computer via a channel interface 214 that conforms to a standard channel interface such as Fibre Channel, SCSI or equivalent. Core logic 230 may also communicate with the storage media of NVSM 30 through an interface controller 218 that implements a standard such as SATA or an equivalent thereof appropriate to the type of media employed within the NVSM 30. Core logic 230 can also communicate with the VM 16 through a memory controller 216. Core logic 230 can be implemented in the form of an FPGA (field programmable gate array), ASIC (application specific integrated circuit) or some other equivalent integrated circuit 212 technology.

In an embodiment, the core logic 230 can be implemented as a microcontroller that includes a processor that executes firmware stored in a small non-volatile memory by which to control the functioning of the SSD 5, or as a sequential state machine or some other form of sequential combinatorial logic. Those of skill in the art will recognize that the controllers 214, 216 and 218 can also be incorporated within the same integrated circuit 212 as the core logic 230, or can be implemented using any other physical partitioning of the functions as may be deemed preferable.

An embodiment of the control process 500, which is executed by the control logic 230 in conjunction with the other components of the SSD 5, is illustrated by the procedural control diagrams of FIGS. 4-10. In an embodiment, the control process 500 operates in four primary modes: (Re)populate mode 516, FIGS. 4 and 5A-C; Primary Power On mode 518, FIGS. 4 and 6A-B; Primary Power Off mode 520, FIGS. 4 and 8; and Secondary Power Save mode 524, FIGS. 4 and 9.

In (Re)populate mode 516, the SSD controller 12 populates (in the event a new NVSM 30 is provided with pre-loaded data) or repopulates (in the event that the SSD 5 is coming back up from a shutdown due to loss of primary power) the VM 16 with data stored in or on the NVSM 30 storage medium. The SSD controller 12 also processes Input/Output (I/O) requests from the host computer during the (re)population process so that the SSD 5 does not have to wait until the entire VM 16 has been (re)populated to begin serving the host computer.

In an embodiment, the (Re)populate mode 516 of the present invention minimizes the impact on system performance that heretofore has plagued previous SSD implementations endeavoring to service I/O requests from a host in parallel with the (re)population of the VM 16. In an embodiment, this can be accomplished by writing to the VM 16 data retrieved from the NVSM 30 in servicing a READ request. The fact that this data has been (re)populated in the process of servicing a READ request is recorded in a (Re)populated List 60, FIG. 3, which is maintained by Core Logic 230 of SSD controller 12. This eliminates the data retrieved as a result of processing a READ request from the data that still needs to be (re)populated from the NVSM 30 to the VM 16. Likewise, any data written to the VM 16 in processing a WRITE request from the host can be recorded in the (Re)populated List 60 as having been (re)populated. Finally, the data also can be (re)populated from the NVSM 30 to VM 16 in a manner that prioritizes data that was most recently or most often accessed prior to a shut-down. This information can be stored in association with the data when it is written to the NVSM 30. In this way, the SSD 5 can be brought on-line to service the host after a shut-down during the (re)population process (thereby minimizing system down time), while also minimizing the negative impact on I/O performance previously associated with (re)populating the data in parallel with handling I/O requests.

Once (re)population of the VM is complete, the SSD 5 operates in Primary Power On mode 518. In this mode, the controller 12 not only handles I/O requests for the host computer, but it also steadily replicates the data stored in the VM 16 to the NVSM 30 in between servicing pending I/O transactions. Replication serves to minimize the amount of data that must be written to the NVSM 30 during a shut-down. Replication also improves reliability in that it minimizes the amount of battery power required to write the data stored in VM 16 to the NVSM 30 during a shut-down. This in turn permits the SSD 5 to use the conserved battery power (while in Secondary Power Save mode 524) to continue refreshing the VM 16 after a shut-down. If primary power can be restored while sufficient battery power exists to keep the VM 16 refreshed or powered, the boot up process including (re)population will not be necessary and the system down time is kept to a minimum. In such a case, the SSD 5 can go straight back to Primary Power On mode 518. Any battery power that can be conserved during the shut-down write process can be made available to refresh or maintain the data stored in the VM 16 after the shut-down. This extends the time during which the SSD 5 can hold out for a restoration of primary power and a quick return to Primary Power On mode 518.

In addition, during Primary Power On mode 518, the data is replicated to the NVSM 30 from the VM 16 on a chunk by chunk basis. In an embodiment, writing a chunk (i.e. replicating that chunk of data) to the NVSM 30 storage media is precipitated when the controller 12 has detected that a certain percentage of that chunk of data has been overwritten through the execution of write requests from the host to the VM 16. This replicate threshold can be specified as percentage of the data of a chunk that has been changed (e.g. a percentage replicate threshold), or it can be given as an absolute number of megabytes of changed data (e.g. an MCD replicate threshold). Those of skill in the art will recognize that the percentage or amount for the replicate threshold, as well as the size of the chunks, can be varied to optimize the process depending upon other system variables. Thus the actual values of the replicate threshold and the chunk size can be varied without exceeding the intended scope of the invention. In the case where the NVSM 30 includes a magnetic disk as its storage medium, the replicate process ensures that the replicate writes to the magnetic disk of the NVSM 30 are particularly friendly to its disk drive by making them continuous and only after sufficient data has been overwritten to warrant them. Thus, replicate writes will not typically involve numerous random seeks on the disk. This therefore increases the reliability and longevity of a magnetic disk drive and its associated mechanics, as well as minimizing the write time for the data.

The controller 12 also monitors all chunks over time such that if certain chunks do not reach or exceed the replicate threshold level that would otherwise trigger a replication write to the NVSM 30 for those chunks within some period of time. Those chunks are also written periodically to the NVSM 30 upon the expiration of such a periodic stale data period, which could be once an hour for example. Those of skill in the art will recognize that this can be implemented on an individual chunk basis, or the SSD controller 12 could simply initiate a replicate write to the NVSM 30 for all chunks upon expiration of the stale data period.

Processing moves to the Primary Power Off mode 520 from the Primary Power On mode 518 when there is an interruption in the primary power supply. During this mode, the SSD controller 12 performs a shut-down process during which any data not replicated while the SSD 5 was in Primary Power On mode 518 must be written to the NVSM 30 using the secondary power source. In the case where NVSM 30 includes a magnetic disk as its storage medium, the outer portion of the disk (which is the fastest portion of the disk to access due to the higher tangential velocity of the tracks there) is reserved for the shut-down write process. This further minimizes the time necessary to save off the unreplicated data from the VM 16 to the NVSM 30 and thus further conserves the internal battery power.

In Secondary Power Save mode 524, which is entered upon completion of the shut-down process and if the battery has a charge level that meets or exceeds a shutdown threshold (SdTh), all components of controller 12 not required to maintain data in the VM 16 or to continue to monitor for the restoration of primary power and the current battery charge level can be disconnected from power to further conserve the battery power. The secondary power supplied by the internal battery is then used to refresh the VM 16 when its storage medium is DRAM, or to supply constant power if the storage medium is SRAM for example. If the primary power is restored while the internal battery still has sufficient charge to meet or exceed the shutdown threshold SdTh, the SSD 5 can return directly to the Primary Power On mode 518 without need for repopulating the VM 16 from the NVSM 30. If the battery charge level falls below SdTh, the SSD 5 ceases refreshing and/or maintaining the data stored in the VM 16 storage medium and shuts down. The controller 12 then awaits restoration of primary power at block 510. When primary power is restored, the SSD 5 proceeds to (Re)populate mode 516 once more, providing that the battery charge level at that time exceeds the predetermined primary power on battery threshold (PoTh). Otherwise the controller 12 waits until the battery charges to the PoTh before proceeding. In an embodiment, PoTh would typically be less than SdTh.

In an embodiment capable of supporting the hot-swapping of the secondary power source 40 and/or the NVSM 30, the controller 12 will monitor for the presence of the hot-swappable component(s) while operating in certain of the aforementioned modes. In an embodiment, the secondary power source 40 can be swapped while in (Re)Populate mode 516 and Primary Power On mode 518. Swapping the secondary power source 40 during these modes has no effect on the operation of the SSD device. Those of skill in the art will recognize that removing the secondary power source 40 from the SSD 5 during Primary Power Off mode 520 or Secondary Power Save mode 524 will lead to undesirable results in that the SSD 5 will cease to function. Thus, the user will be advised not to perform a hot swap during these modes. In an embodiment, the SSD 5 can provide a visual display indicating to the user the mode in which the SSD is currently operating to avoid a hot swap of secondary power source 40 during the aforementioned modes.

In an embodiment, the NVSM 30 may be hot-swapped during Primary Power On mode 518 and Primary Power Off mode 520. If the NVSM 30 is removed during Primary Power On mode 518, the replication process is suspended until an NVSM 30 has been re-inserted. At this time, the replication process will assume that the storage medium of the NVSM 30 is blank and that all data in the VM 16 must be replicated to the NVSM 30. If the NVSM 30 is removed during the Primary Power Off mode 520, the shut-down process (including the shutdown write to the NVSM 30) is suspended until an NVSM 30 is reinserted. In this case, it is assumed that the storage medium of the NVSM 30 is blank and thus all data currently stored in the VM 16 is presumed unreplicated and all data in the VM 16 is written to the disk as part of the shutdown process.

Moreover, the control process 500 provides user selectable options that permit the SSD 5 to boot up with the secondary power source 40 removed, the NVSM 30 removed, or both. If the user selects the volatile boot up option (i.e. both the secondary power source 40 and NVSM 30 are removed), then SSD control process 500 proceeds directly to Primary Power On Mode 518, and enters Hot-Swap NVSM processing at block 942 where replication writes are suspended to NVSM 30. I/O Requests are handled in parallel at I/O Request Processing 904. The user may also select a battery backup boot up option (i.e. only NVSM 30 is removed), whereby the SSD control process 500 behaves as previously described for the volatile boot option, except that during Primary Power Off Mode 520, the process proceeds to decision block 1044 and awaits insertion of NVSM 30, at least until the battery charge is exhausted. If the user selects a slow write option (i.e. only the secondary power source 40 is removed), the SSD control process 500 proceeds to the (Re)populate Mode 516 and turns on the I/O channel at 808. In this case, however, writes are sent directly to NVSM 30 thereby bypassing the VM 16 to ensure non-volatility. In another embodiment, the user can choose the fast write option when the secondary power source 40 is removed. This option is identical to Primary Power On Mode 518, except that because the secondary power source 40 is removed, this is a volatile mode and in the event of primary power loss, any non-replicated changes will be lost.

A more detailed discussion of an embodiment of the SSD control process 500 of the present invention is now presented with reference to FIGS. 4-10. Initially, primary power is applied to the SSD 5 at block 510. This can be subsequent to an interruption of the primary power, or it could be the first time the SSD 5 is booted up. Primary power is typically supplied from a standard external AC or DC power source but could also be supplied by a battery external to the SSD 5, such as in the case of a lap-top or notebook computer for example. At decision block 512, the controller 12 determines if a secondary power source 40 and/or an NVSM 30 is present. If Yes, processing proceeds to (Re)Populate mode 516. If the secondary power source 40 is removed, the answer at 512 is No and processing proceeds at decision block 514 where it is determined if the user has chosen to permit boot-up of the SSD 5 without a secondary power source 40. If Yes, then processing proceeds to (Re)Populate mode 516. If No, processing is suspended until the presence of a secondary power source is detected at 512. Similarly, if the NVSM 30 is removed, the answer at 512 is No and processing proceeds at decision block 514 where it is determined if the user has selected one of the aforementioned boot up options to continue without NVSM 30. If Yes, processing proceeds to (Re)Populate mode 516 and because NVSM 30 is removed the answer at decision block 810 and 821 is Yes and processing proceeds to Primary Power On Mode 518.

With respect to the (re)population process, if primary power has been restored after an interruption of the primary supply, then the nature of the process is a repopulation of data. If the power is being applied to the SSD 5 for the first time or after insertion of a new NVSM 30 (or even a new storage medium within the NVSM 30), then the VM will essentially be populated with the data for the first time. Those of skill in the art will recognize that this distinction is semantic in nature, and only distinguishes between two scenarios involving the identical process: 1) data is retrieved from the NVSM 30 and stored in the VM 16 for the first time; and 2) data that was once stored in VM 16, was replicated to the NVSM 30 during Primary Power On mode 518, was temporarily written to the NVSM 30 during shutdown while in Primary Power Off mode 520, and is then retrieved and stored to VM 16 once primary power has been restored. Other than the foregoing distinction, the process connoted by the two terms is the same and thus the terms populate and repopulate are used interchangeably herein, often as (re)populate.

During (Re)populate mode (516, FIG. 5A), primary power is coupled to all of the components of the controller 12, as well as VM 16 and NVSM 30 at block 610. This occurs in the event that certain of the components of the SSD 5 and controller 12 may have been decoupled from the power supply during Secondary Power Save mode 524. The controller 12 then coordinates the (re)population of the VM 16 from the NVSM 30 at block 612 based on file list information that is associated with the data stored on or in the storage media of the NVSM 30, which includes appropriate address locations for the data in the VM 16.

Figure 5A:
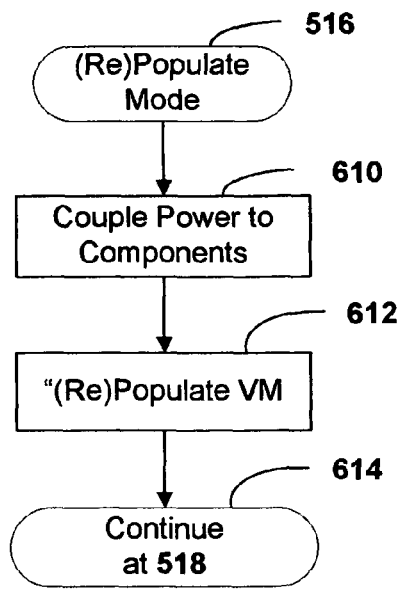
Figure 5B:
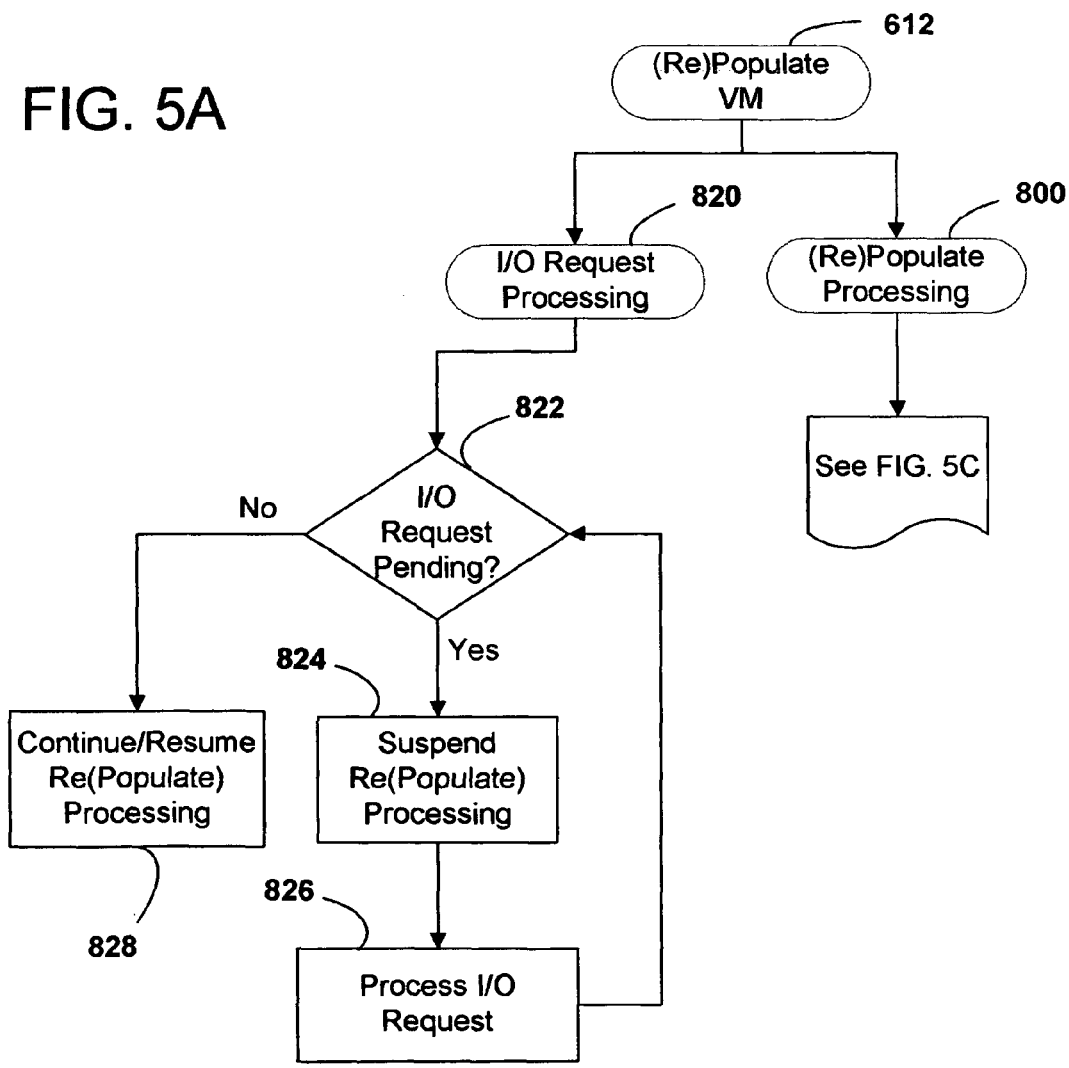
Figure 5C:
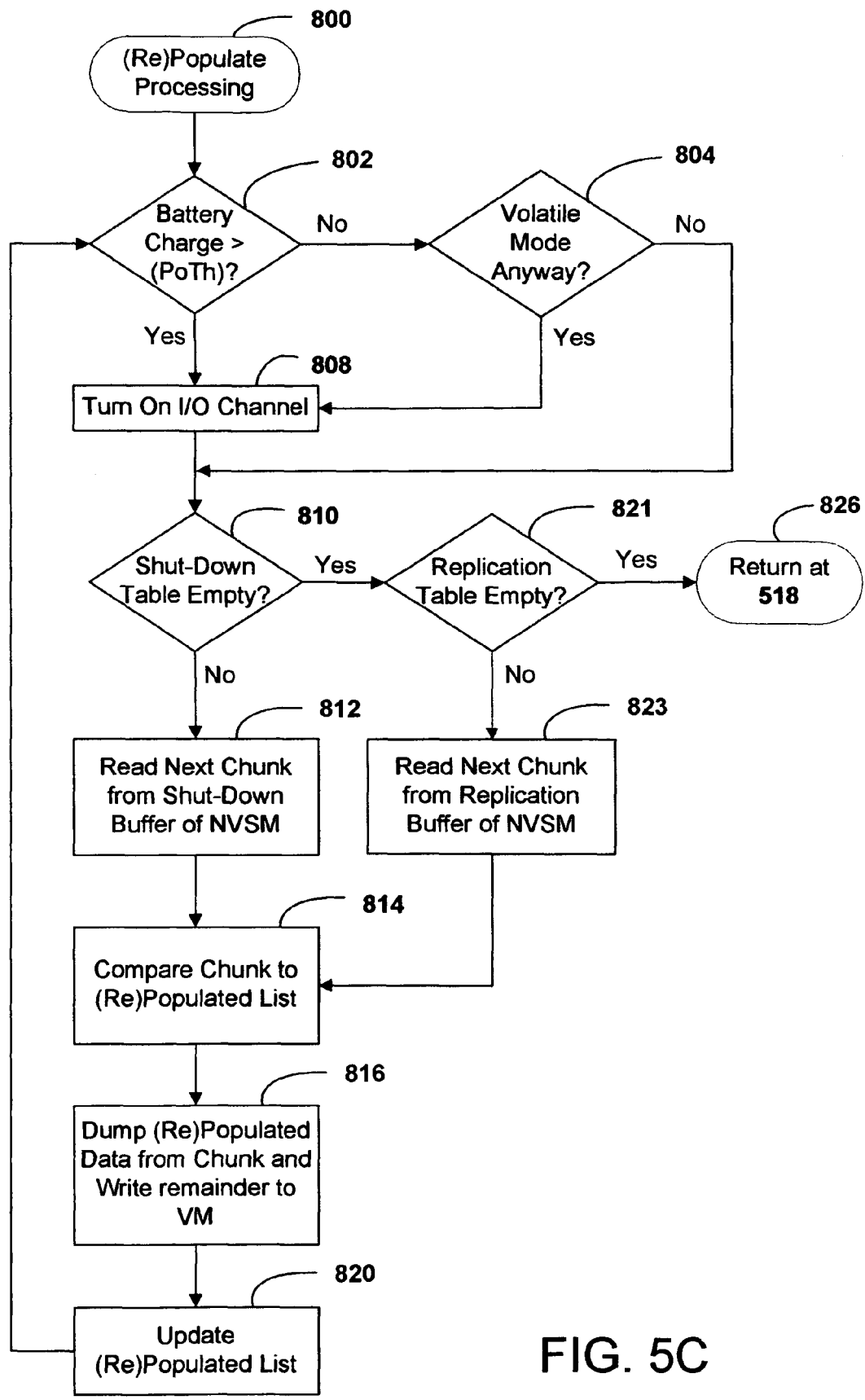

A more detailed description of an embodiment of the (Re)populate VM process 612 is illustrated in FIGS. 5B-C. The (Re)populate VM process 612 comprises two sub-processes that run in parallel. I/O Request Processing 820 handles I/O requests from the host as a priority and (Re)Populate Processing handles the (re)population of the VM 16 when no I/O requests are pending. In an embodiment, upon entering the (Re)populate VM process 612, the I/O Request Processing 820 is active first and the secondary source of power is tested at 802 to determine if it has a charge level greater than the predetermined primary power on threshold capacity (PoTh). In an embodiment, this could be sufficient capacity to ensure that a worst case amount of unreplicated data can still be written from the VM 16 to the NVSM 30 in the event primary power is lost shortly after boot up. If the secondary power source 40 is present and has sufficient charge to meet the power on threshold (PoTh), the I/O channel is turned at 808 and processing continues at 810. In addition, I/O Request Processing 820, FIG. 5B is also enabled.

If the charge level of the secondary power source 40 is not at or above that threshold (either because the one present is not sufficiently charged or because there is none present), the control process proceeds to decision block 804. If the user has chosen to proceed in Volatile Mode (i.e. to process I/O requests from the host using the VM 16) without a sufficiently charged secondary power source 40 or without one being present, the answer at 804 is Yes and the I/O channel is turned on at 808 to enable receipt of I/O requests from the host. Again, (Re)Populate Processing continues at 810 and I/O Request Processing 820, FIG. 5B is also enabled. If the user has not chosen to enable Volatile Mode in the absence of a sufficiently charged secondary power source 40, the answer at 804 is No and processing proceeds straight to 810 and thus the I/O channel is not enabled. (Re)Population Processing therefore continues without I/O Request Processing until a secondary power source 40 is present that has a sufficient charge level that meets the PoTh before proceeding to process block 808 and turning on the I/O channel.

Figure 4:
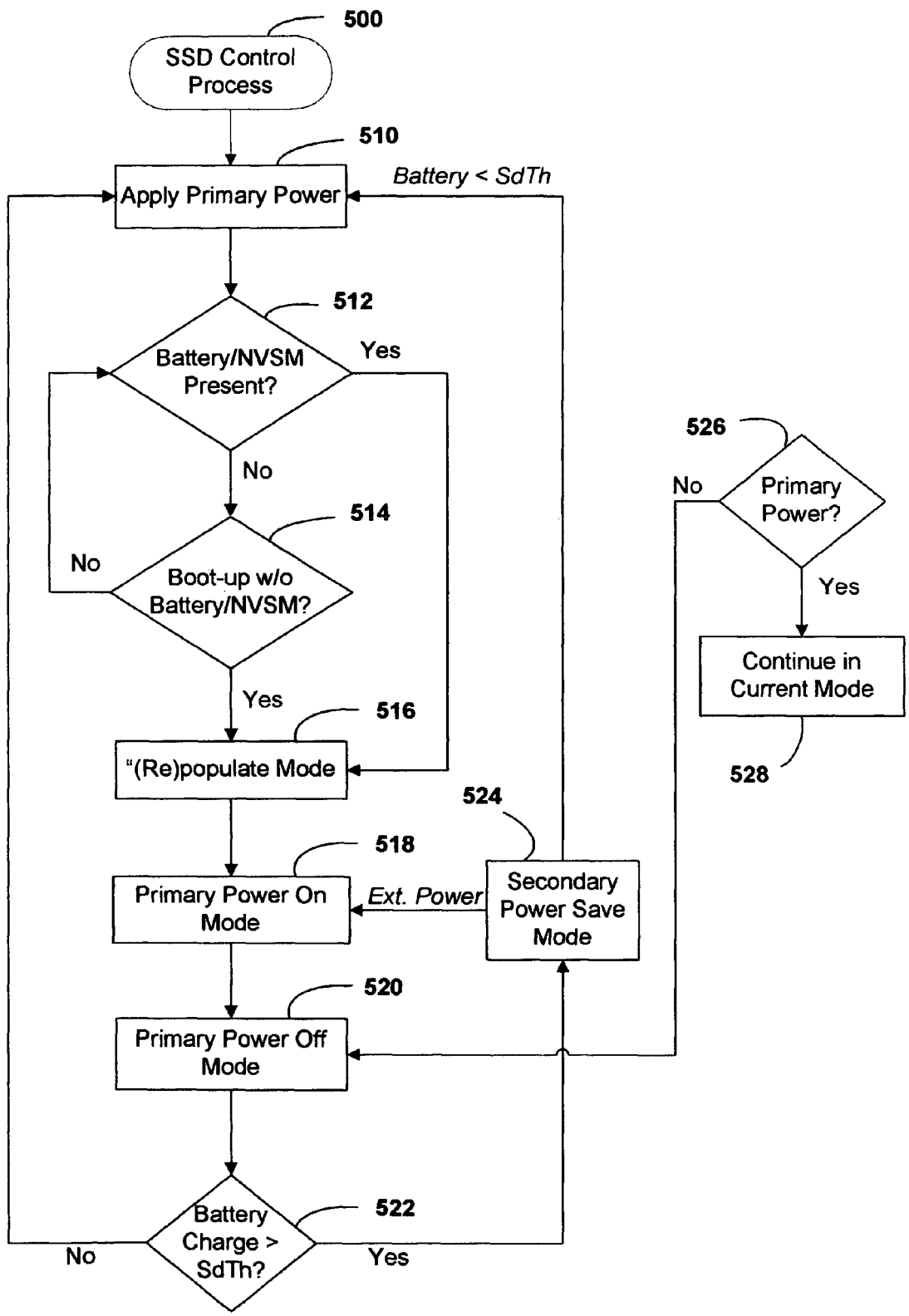
FIGS. 4-10 are process flow diagrams illustrating embodiments of the control process of the present invention.
Figure 10:
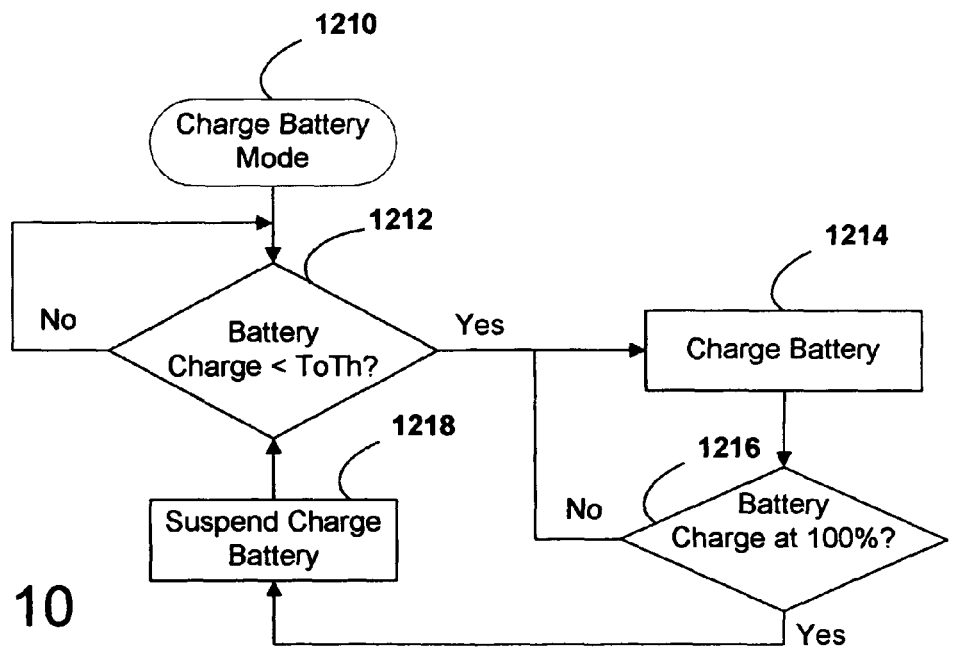

In an embodiment, the SSD secondary power source 40 is charged by Charge Battery process 1210, FIG. 10, which runs in parallel with the other processes and modes of FIG. 4. During this process, which runs in the presence of primary power, the secondary power source 40 is monitored continuously as indicated. If the charge level of the secondary power source 40 is determined to be below some top-off threshold (ToTh) (for example, 95% of capacity) at decision block 1212, the secondary power source 40 is charged using the primary power source at 1214. If from there it is determined at decision block 1216 that the charge level of the secondary power source 40 is substantially at 100% of capacity, the charging process is suspended at block 1218 and the secondary power source 40 is not charged until it is once again determined that the battery charge level has fallen below the ToTh at 1212. Of course, this process will not operate in the absence of a secondary power source 40.

Returning back to the discussion of the (Re)Populate Process 800 at block 810, in an embodiment, the NVSM 30 includes a magnetic disk as its storage medium. The disk can be partitioned into at least two areas. The first can be called the shut-down buffer area and typically includes tracks at the outside of the disk, which has the greatest tangential velocity and thus is the fastest area of the disk to access. A second area can be called the replication buffer area of the disk, and this contains data that was written to the disk during the replication process of the Primary Power On mode 518. In this case, the data is written to the storage medium of NVSM 30 more as it is arranged in the VM 16 because it was replicated in the presence of primary power and thus time was not of the essence.

At decision block 810, the controller 12 first determines whether a Shutdown Table is empty that contains the file information for any data that was previously written to the NVSM 30 during a shut-down after loss of power. This file information can include the total amount of data written to the shutdown buffer and the memory address information for purposes of (re)population of the VM 16 to the proper locations. This file data can also include information concerning how recently the data was accessed and/or how often it has been accessed. In an embodiment, data can be chunked and organized in the table using this information giving priority to data that was most recently or most frequently accessed prior to the shutdown.

If the answer at 810 is No, then the next chunk of data as indicated in the shutdown table is retrieved from the shutdown buffer area of the disk, (or of whatever other storage medium that is used in the NVSM 30). At 814 the chunk is compared to file data stored in a list called the (Re)populated List (60, FIG. 3) that is recorded by the core logic 230 of the controller 12. If any of the data has already been previously (re)populated within the VM 16, that data is dropped from the chunk and only the data that is left is written to the VM 16 at 816. The core logic 230 then updates the (Re)populated List 60 to indicate that the data has been repopulated and processing continues at 810.

If the answer at 810 is Yes, a similar table called the Replication Table is consulted that contains file data for data that was previously replicated to the replication buffer area of the storage medium of the NVSM 30 during the Primary Power On mode (518, FIG. 3). The filed data in this table is substantially the same as that described for the Shutdown Table. Accordingly, the data in this table could be chunked and ordered in a manner that gives priority to (re)populating data that was most recently accessed, for example. If this table is not empty, the next chunk of data stored in this table is retrieved at 823 and the same process is then applied at blocks 814, 816 and 820 to this chunk as to the chunks retrieved from the shut-down buffer area of the NVSM 30 storage medium. If the data stored in the two tables is organized to prioritize data most recently accessed, the SSD 5 can get the data most likely to be accessed by the host repopulated more quickly than the more stagnant data. When both tables are empty, the entire VM 16 has been (re)populated and processing returns at Primary Power On mode 518, FIG. 3.

When the I/O channel has been enabled at 808 under the conditions previously discussed, controller 12 then monitors in parallel the I/O channel for I/O requests from the host (at 822, FIG. 5B). If an I/O request is received from the host and is pending, the (Re)populate Processing 800, FIG. 5C is interrupted and suspended at 824, FIG. 5B. The controller 12 then handles the request at 826 and returns to see if any other requests are pending. If not, the (Re)populate Processing 800, FIG. 5C resumes from wherever it was suspended until the next I/O request is received. In this way, the SSD 5 is able to handle communications with the host even before the (re)population of the VM 16 has been completed.

Figure 6A:
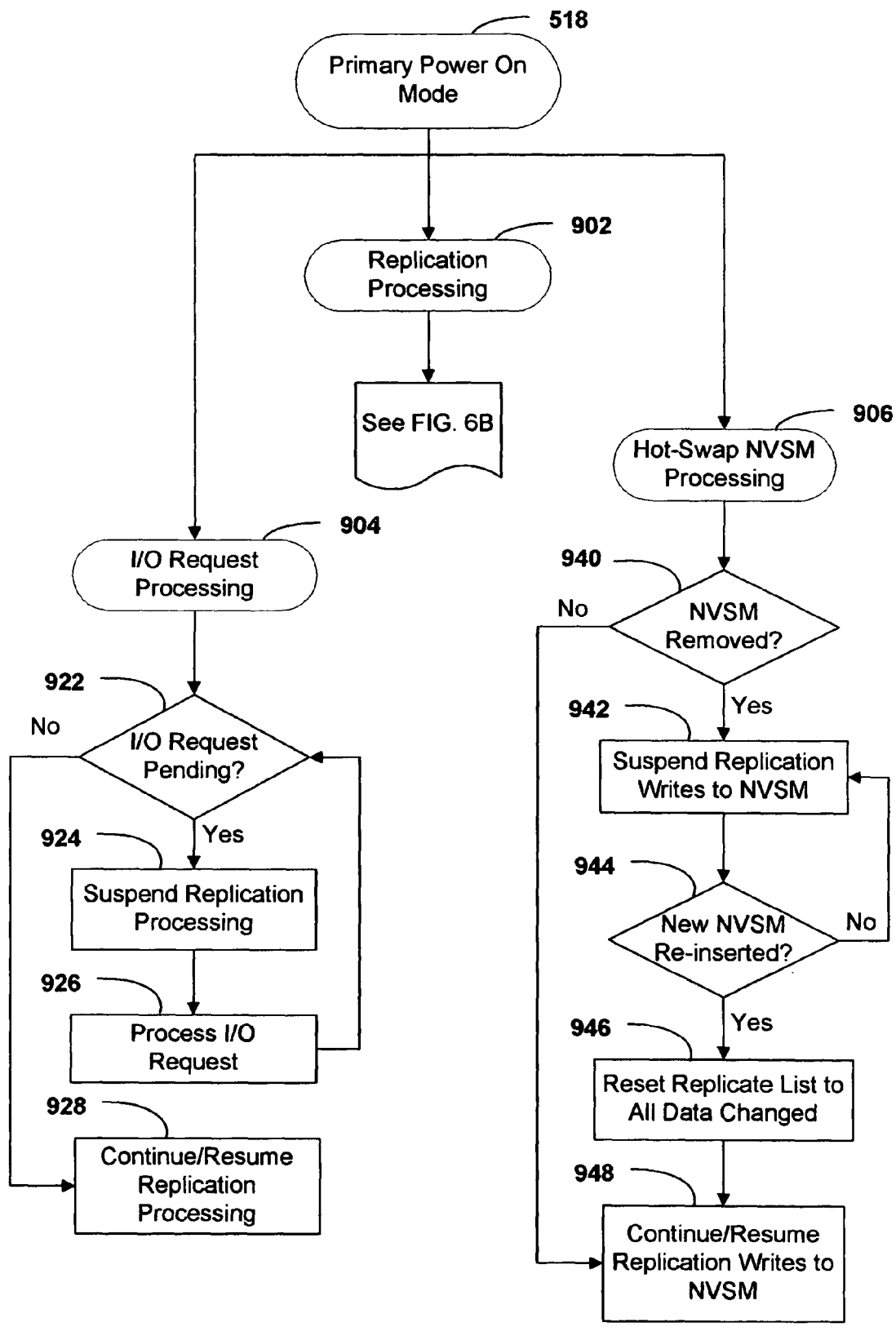

Primary Power On mode (518, FIG. 6A-B) consists of three sub-processes, including I/O Request Processing (904, FIG. 6A), Replication Processing (902, FIG. 6B) and Hot-Swap NVSM Processing (906, FIG. 6A). Thus, controller 12 monitors all processes of Primary Power On mode 518 in parallel with the receipt of I/O requests from the host at 922. When an I/O request is pending, the Replication Processing 902 is suspended at 924 and the I/O request is processed by the controller 12 at 926. Once the request is processed, if there are no further requests pending, the Primary Power On process 518 resumes or continues at 928 until another I/O request is received.

Figure 6B:
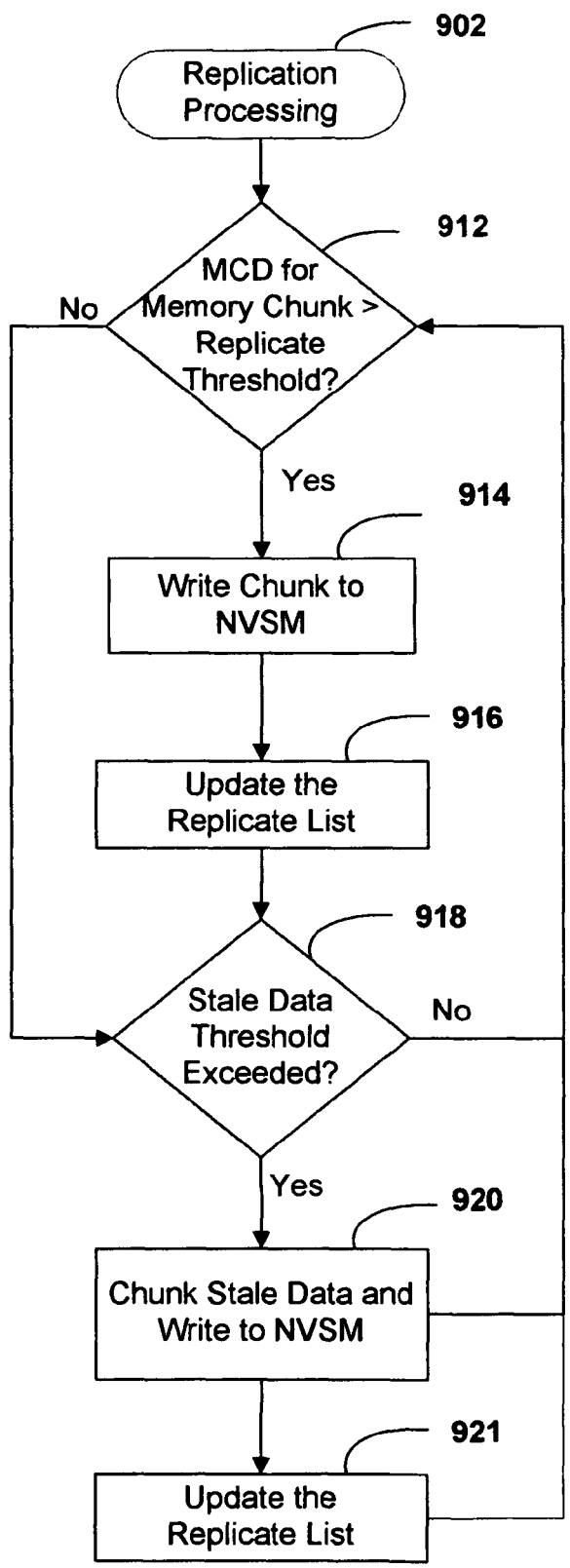
Figure 7:
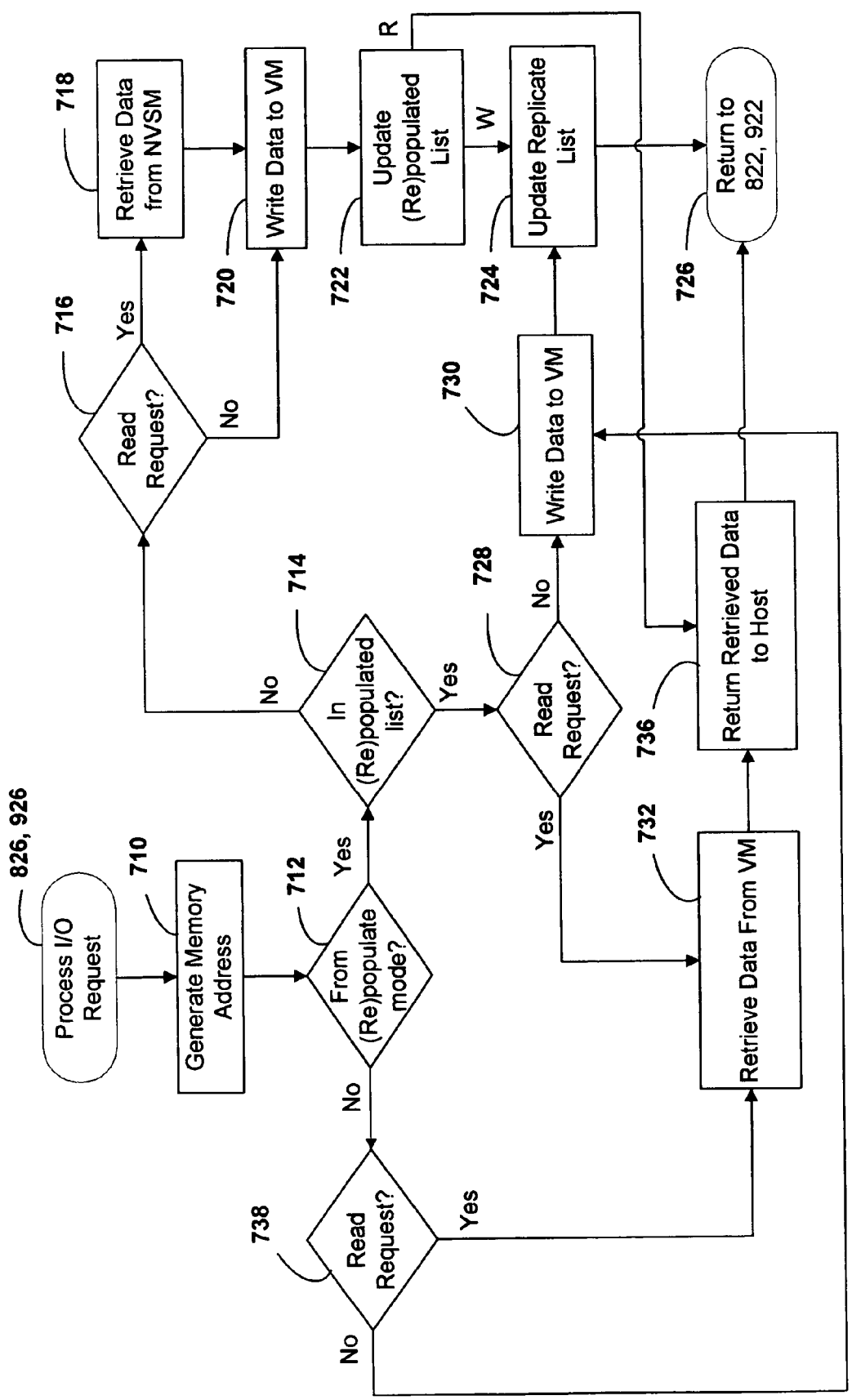

Before continuing with the discussion of the Primary Power On mode 518, it will be informative to present the operation of how I/O requests are processed with reference to FIG. 7. This is because the processing of the I/O requests affects the replication process of the Primary Power On mode (518, FIG. 6A-B) as well as the (Re)populate Processing (800, FIG. 5C) as previously discussed. As indicated, the Process I/O Request at 826, 926 can be called from either the (Re)populate VM process 612 at 826 (FIG. 5B) or during the Primary Power On mode at 926 (FIG. 6A-B). Regardless from which mode the Process I/O request is made, the controller 12 translates at block 710 the virtual address received with the request from the host to a memory address for accessing the VM 16. Those of skill in the art will recognize that this translation is typically required because the host typically employs virtual addressing, which must be translated to a real address of the VM 16. Nevertheless, the host still specifies the address locations of the VM 16 with its I/O requests, albeit through this address translation process.

If called from the Primary Power On mode 518, the answer at decision block 712, FIG. 7 is No and processing continues at decision block 738 where it is determined if the I/O request is a READ or a WRITE. If it is a READ, the answer at 738 is Yes and processing continues at 732. Because (re)population of the VM 16 has already been completed if the controller 12 is in Primary Power On mode 518, the controller 12 knows that the data is in the VM 16 and thus it is retrieved at 732 from the VM 16 and returned to the host at 736. Processing then returns to 922, FIG. 6A. If the request is a WRITE, the answer at 738 is No and the data is written to the VM 16 at the generated memory address. The Replicate List 62 is then updated at 724 within the appropriate chunk to record that the data at this location has been overwritten and needs to be replicated.

If the I/O Request process is called from the (Re)populate VM process at 826, the answer at 712 is Yes. If the data for that address is not recorded in the (Re)populated List 60, then the answer at 714 is No and this indicates that the data sought by the host has yet to be (re)populated. If the request is a READ, the answer at 716 is Yes and the data is retrieved directly from the NVSM storage medium at 718. The controller then writes the retrieved data from the NVSM 30 to its appropriate location in the VM 16 and the (Re)populated List 60 is updated at 722 to reflect that this data has now been (re)populated. Because it is a READ request, it follows the R path from block 722 to block 736 where the retrieved data is then provided to the host. Processing then returns to 822 at block 726.

If the request is a WRITE, then the answer back at block 716 is No. The data provided by the host with the WRITE request is written to the VM 16 at block 720 and the (Re)populated List 60 is updated at 722 to record that the data should not be (re)populated from the NVSM 30 any longer; the data currently stored in the NVSM 30 for this location is now stale. Processing follows the path marked W and the Replicate List 62 is also updated at 724 to note that this data location has been overwritten with respect to the data that is stored in or on the NVSM 30 storage medium and that it should be written to the VM 16 during the replication process.

Back at block 714, if the memory location(s) specified with the pending request is (are) in the (Re)populated List 60, the answer is Yes. Processing then continues at 728 where if the request is a READ, the answer is also Yes and data is retrieved from the VM 16 at block 732 and returned to the host. Because the data is not overwritten by the READ request and has already been (re)populated, neither the (Re)populated List 60 nor the Replicate List 62 needs to be updated. Processing continues at 726 where it returns to 822, FIG. 5B. If the pending request is a WRITE, the answer is No at 728 and the data provided by the host is written to the VM 16 at the specified location(s). Because the WRITE process effectively overwrites the data stored in the NVSM 30 that is associated with the specified addresses location(s), it must be recorded in the Replicate List 62 so that the changed data is marked for replication back to the NVSM 30. Again, processing continues at 726 from where it returns to 822, FIG. 5B.

Returning back to the Replication Processing (902, FIG. 6B) of Primary Power On mode 518, the controller monitors at decision block 912 the replicate list 62 for chunks of data that have been modified by some percentage greater than a predetermined replicate threshold percentage or by some replicate threshold given in total amount of data changed (e.g. megabytes of changed data (MCD)). For example, in an embodiment, the replicate threshold could be when 80% or more of the data in a particular chunk has been overwritten. When this percentage threshold or total data changed threshold has been met or exceeded for a chunk in the Replicate List 62, the answer at 912 is Yes and the chunk is then replicated (i.e. written) to the NVSM 30 at 914. The Replicate List 62 is then updated at 916 to indicate that this chunk has been replicated and that the percentage of changed data for that chunk is back to zero.

The controller 12 also monitors those chunks with changed data that have not exceeded the replicate threshold over some predetermined period of time. When this time period has been exceeded, all stale chunks are written to the NVSM 30 at 920. Those of skill in the art will recognize that the data can be re-chunked to improve the efficiency of writing the stale data in accordance with algorithms the details of which are not pertinent to the embodiments of the present invention disclosed herein. Also as previously mentioned, the optimal values for the replicate threshold, the size of the chunks and the stale data period can vary depending upon the particular application, etc. Thus the actual values used are not specific to the embodiments disclosed herein.

Hot-Swap NVSM Processing (906, FIG. 6A) of Primary Power On mode 518 monitors for the hot-swapping of the NVSM during the Primary Power On mode 518. If the NVSM 30 is removed, the answer at 940 becomes Yes and writes to the NVSM during Replication Processing are suspended at 942. Once the NVSM 30 is re-inserted, the answer at 944 is Yes and the replication list is reset at 946 so that all data in the VM 16 is marked as changed and in need of replication. Writes to the NVSM during Replication Processing 904 are resumed at 948.

Figure 8:
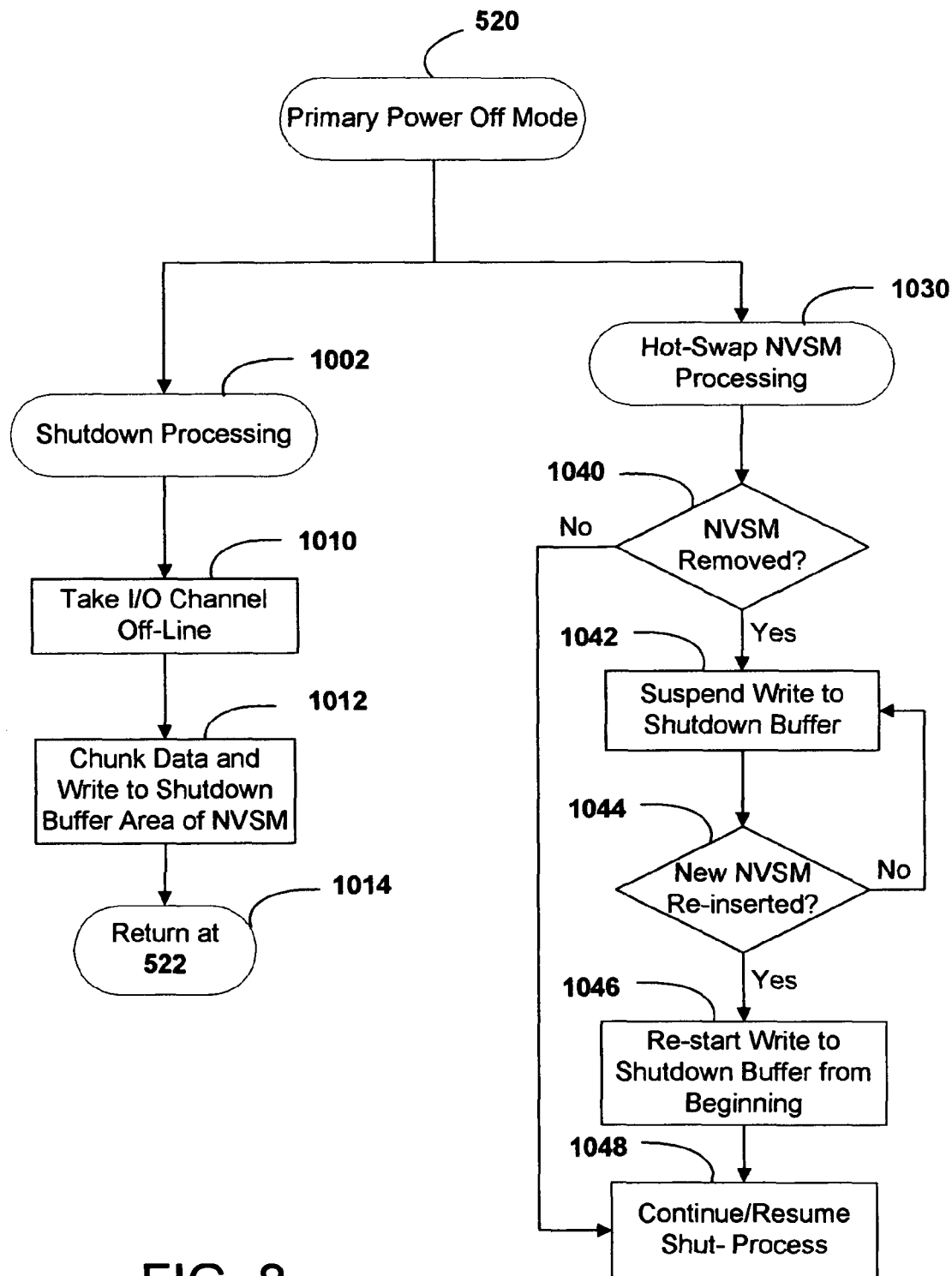

With reference to FIG. 4, if primary power should be lost and this loss is detected at 526, processing will proceed to Primary Power Off mode 520. With reference to FIG. 8, Shutdown Processing 1002 proceeds to block 1010 where the I/O channel is taken off line so no further I/O requests from the host are permitted. This also helps to conserve the secondary battery power which is now being applied to the remaining controller 12 components as well as the VM 16 and NVSM 30. The next step is to chunk any data listed in the Replicate List 62 and write it to the shut-down buffer area of the NVSM 30 storage medium. In an embodiment, the storage medium is a magnetic disk and the shut-down buffer area includes the most outside tracks available on the physical disk. Once this process has been completed, processing returns at 1014 to decision block 522, FIG. 4.

In an embodiment, a second sub-process of Primary Power Off mode 520, Hot-Swap NVSM Processing (1030, FIG. 8) monitors for the hot-swapping of the NVSM 30 while in the Primary Power Off mode 520. If removal of the NVSM 30 is detected at 1040, write operations to the NVSM 30 as part of the Shutdown Processing 1002 are suspended at 1042 and remain so until an NVSM is detected as present again at 1044. Shutdown writes to NVSM 30 of Shutdown Processing 1002 resumes at 1048. This time all data in VM 16 is chunked and written to the NVSM 30 at 1012, rather than only that data not previously replicated. This is because it is assumed that the medium of the NVSM 30 that has been re-inserted is new and empty.

Once the shutdown write has been completed, it is determined at 522, FIG. 4 whether the current battery charge level is still above the predetermined shutdown threshold level (SdTh). This threshold could be, for example, the amount of battery power required to handle a worst case shut-down write of replicated data to the NVSM 30 medium plus some safety margin. If the answer is No, the SSD controller 12 shuts down and awaits the restoration of primary power at 510. In the meantime, the Charge Battery mode 1210 also awaits restoration of the primary power source, as it cannot charge the internal secondary battery supply without it. If the answer is Yes at 522, processing continues at 524 where the controller enters Secondary Power Save mode 524.

Figure 9:
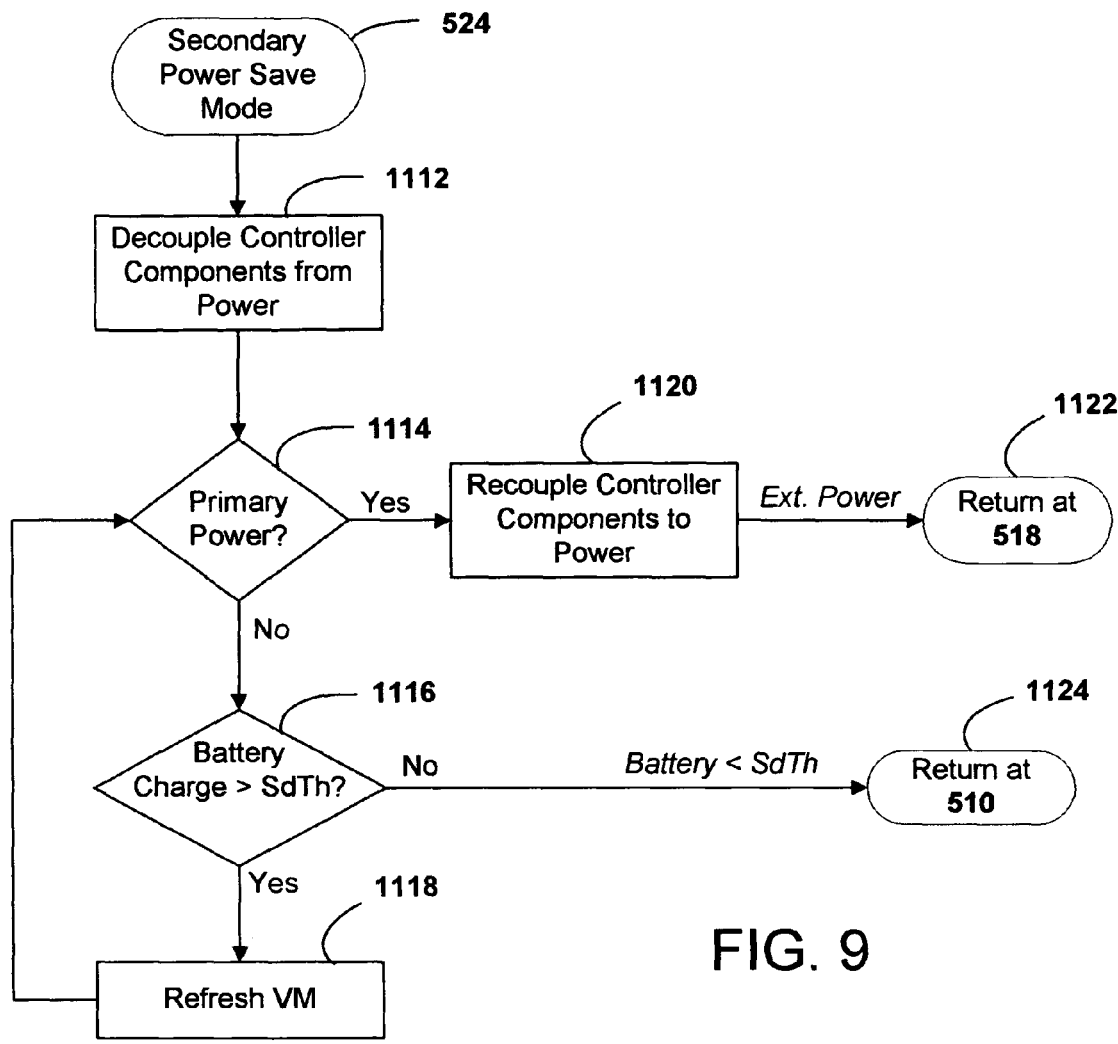

With reference to FIG. 9, Secondary Power Save mode 524 begins at 1112 by decoupling all non-essential components from the internal secondary battery supply, except for example, those components necessary to refresh the VM 16 and to monitor primary power and internal battery charge level. Should primary power be restored while in Secondary Power Save mode 524, the controller components are recoupled to the primary power supply at 1120 and processing returns directly to Primary Power On mode 518 at block 1122. If power is not currently restored then the answer at 1114 is No and it is determined at 1116 if the battery charge level is still greater than the threshold SdTh. If Yes, processing continues at 1118 where the VM 16 is refreshed. Controller 12 continues to monitor for the restoration of primary power at 1114 and for the battery charge level to fall below the threshold SdTh at 1116. So long as the charge level of the secondary power source remains greater than SdTh, the controller continues to refresh or otherwise maintain the data stored in the media of VM 16. If the battery charge level is detected at 1116 to fall below SdTh, the controller 12 ceases to refresh or otherwise maintain the data in VM 16. Processing continues at 510, FIG. 4 where the controller 12 ceases activity except to monitor for the restoration of primary power at 510, FIG. 4. Those of skill in the art will recognize that if the VM 16 comprises storage media that does not require refreshing, but rather a steady power supply, the process described above will supply the constant supply rather than periodically refreshing the medium.

In summary, it can be noted that during Primary Power On mode 518, the Replicate List 62 records data to be replicated within defined chunks so that the controller 12 always knows what data needs to be updated to the NVSM 30. Replication of data can proceed on an ongoing basis whenever it is opportunistic to do so in between processing I/O requests. During the (Re)populate mode 516, the (Re)populate List 60 permits the controller 12 to handle I/O requests during the (re)populate memory process 616. As previously mentioned, replicating data to the NVSM 30 on an ongoing basis in between I/O requests helps to reduce the amount of data that needs to be written during a shut-down due to loss of primary power. This serves to conserve the internal secondary battery power for other purposes, including refreshing or maintaining the data in VM 16 long enough to see restoration of primary power. This permits the controller 12 to skip the (re)population process altogether. Moreover, by writing data in chunks when a large percentage of the chunk has been altered permits writes that are continuous and friendly to the storage medium of NVSM 30 (particularly when the medium is a magnetic disk). Finally, as previously mentioned, handling I/O requests during the (re)population process renders the SSD 5 available to the host sooner after a shutdown, further minimizing the time necessary to recover from a power loss and thus minimizing downtime. In addition, SSD 5 has been designed to facilitate the removal of the secondary power source 40 and/or the NVSM 30 for purposes of hot-swapping these components while in certain modes of operation. The control process 500 has been expanded to monitor for and handle the hot-swapping of these components in the appropriate modes. The control process 500 can also handle boot-up of the SSD 5 with or without one or both of these components based on the choice of a user. Finally, an embodiment of the SSD is disclosed that can fit a 3.5 inch form factor or smaller, providing functionality not previously achieved at this or smaller form factors.

What is claimed is:

1. A solid state disk (SSD) comprising:
a non-volatile storage module (NVSM);
a secondary power source coupled to power inputs of the SSD;
a volatile memory (VM);
a controller in communication with the NVSM and the VM, the controller operable in a (re)populate mode to (re)populate data stored in the NVSM to the VM when primary power is initially applied to power inputs of the SSD and further operable in a primary power on mode to replicate data to the NVSM that was written to the VM in response to received I/O requests while primary power is applied to the power inputs of the SSD; and
wherein the secondary power source can be decoupled from the power inputs of the SSD while the controller is operating in either the (re)populate mode or the primary power on mode.

2. The SSD of claim 1 wherein:
the controller is further operable using the secondary power source in a power off mode when primary power is no longer applied to the power inputs of the SSD, the primary power off mode to save any data stored in the VM not replicated while operating in the primary power on mode; and
the NVSM can be decoupled from the controller and other SSD components while the controller is operable in either the primary power on mode or the primary power off mode.

3. The SSD of claim 1 wherein:
the secondary power source is removed from the power inputs of the SSD prior to application of primary power; and
the controller is operable not to operate in the (re)populate mode upon initial application of primary power until the secondary power source has been coupled to the SSD power inputs.

4. The SSD of claim 1 wherein:
the secondary power source is removed from the power inputs of the SSD prior to initial application of primary power to the SSD power inputs; and
the controller is operable in the (re)populate mode upon initial application of primary power, except for processing of received I/O requests which is suspended until the secondary power source has been coupled to the SSD power inputs.

5. The SSD of claim 1 wherein:
the secondary power source is removed from the SSD power inputs prior to initial application of primary power to the SSD power inputs; and
the controller is operable in the (re)populate mode upon initial application of primary power, including processing of received I/O requests.

6. The SSD of claim 1 further comprising:
a housing, the housing comprising a first and second portion separated by a planar member, the first portion comprising a first and second compartment, the first compartment for slideably receiving the secondary power source and the second compartment for slideably receiving the NVSM; and
wherein the secondary power source and the NVSM are accessible to the first and second compartments through openings in the housing, the compartments also providing access to connectors for coupling the secondary power source to the power inputs of the SSD and for coupling the NVSM to the controller.

7. The SSD of claim 6 wherein the dimensions of the housing meet a standard 3.5 inch form factor for computer drives.

8. The SSD of claim 6 wherein the secondary power source comprises a pull tab for facilitating its removal from the first compartment.

9. The SSD of claim 6 wherein the NVSM comprises a pull tab for facilitating its removal from the first compartment.

10. A solid state disk (SSD) comprising:
a non-volatile storage module (NVSM);
a secondary power source coupled to power inputs of the SSD;
a volatile memory (VM);
a controller in communication with the NVSM and the VM, the controller operable in a primary power on mode when primary power is initially applied to power inputs of the SSD, the primary power on mode to replicate data to the NVSM data having been previously written to the VM in response to received I/O requests, the controller further operable using the secondary power source in a primary power off mode, the primary power off mode to save any data to the NVSM that was previously stored in the VM but not replicated while operating in the primary power on mode; and
wherein the NVSM can be decoupled from the controller and other components of the SSD while the controller is operating in either the primary power on mode or the primary power off mode.

11. The SSD of claim 10 wherein:
the controller is further operable in a (re)population mode when primary power is initially applied to the SSD, the (re)population mode to (re)populate data stored in the NVSM to the VM; and
the secondary power source can be removed from the SSD, decoupling it from the controller and other SSD components while the controller is operable in either the primary power on mode or the (re)population mode.

12. The SSD of claim 10 wherein:
the NVSM is removed from the SSD prior to initial application of primary power; and
the controller is operable not to operate in the (re)populate mode upon initial application of primary power until the NVSM has been coupled to the SSD power inputs.

13. The SSD of claim 10 wherein:
the NVSM is removed from the SSD prior to initial application of primary power; and
the controller is operable to bypass the (re)populate mode upon initial application of primary power and operate directly in the primary power on mode.

14. The SSD of claim 10 wherein:
the NVSM is removed from the SSD while the controller is operable in the primary power on mode; and
the controller remains operable in the primary power on mode except that replication writes are suspended.

15. The SSD of claim 14 wherein:
the NVSM is replaced in the SSD;
replication writes are resumed; and
all data stored in the VM is recorded in a replicate list to be replicated.

16. The SSD of claim 10 wherein:
the NVSM is removed from the SSD while the controller is operable in the primary power off mode; and
the controller remains operable in primary power off mode except that shutdown writes are suspended.

17. The SSD of claim 16 wherein:
the NVSM is replaced in the SSD;
shutdown writes are resumed; and
all data stored in the VM is written to the NVSM by way of a shutdown write.

18. The SSD of claim 10 further comprising:
a housing, the housing comprising a first and second portion separated by a planar member, the first portion comprising a first and second compartment, the first compartment for slideably receiving the secondary power source and the second compartment for slideably receiving the NVSM; and
wherein the secondary power source and the NVSM are accessible to the first and second compartments through openings in the housing.

19. The SSD of claim 18 wherein the dimensions of the housing substantially comply with a standard 3.5 inch form factor for computer storage drives.

20. The SSD of claim 19 wherein the secondary power source comprises a handle means for facilitating its removal from the second compartment.

21. An SSD comprising:
a non-volatile storage module (NVSM);
a secondary power source coupled to power inputs of the SSD;
a volatile memory (VM);
a housing, the housing comprising a first and second portion separated by a planar member, the first portion comprising a first and second compartment, the first compartment for slideably receiving the secondary power source and the second compartment for slideably receiving the NVSM;
wherein the secondary power source and the NVSM are accessible to the first and second compartments through openings in the housing, the compartments also providing access to connectors for coupling the secondary power source to inputs providing power to components of the SSD and for coupling the NVSM to the controller; and
wherein the housing has dimensions that substantially comply with a standard 3.5 inch form factor for computer storage drives.

22. The SSD of claim 21 wherein:
the VM further comprises volatile memory components mounted on a VM printed circuit board (PCB);
the SSD further comprises a controller in communication with the NVSM and the VM, the controller comprising one or more components mounted on a controller PCB; and
the VM and controller PCBs are coupled together with a connector and mounted to a surface of the planar member opposite to the first and second compartments.

23. The SSD of claim 22 wherein:
the controller is operable in a (re)populate mode to (re)populate data stored in the NVSM to the VM when primary power is initially applied to power inputs of the SSD and further operable in a primary power on mode to replicate data to the NVSM that was written to the VM in response to received I/O requests while primary power is applied to the power inputs of the SSD; and
wherein the secondary power source can be decoupled from the power inputs of the SSD while the controller is operating in either the (re)populate mode or the primary power on mode.

24. The SSD of claim 23 wherein:
the controller is operable in a primary power on mode when primary power is initially applied to power inputs of the SSD, the primary power on mode to replicate data to the NVSM data having been previously written to the VM in response to received I/O requests, the controller further operable using the secondary power source in a primary power off mode, the primary power off mode to save any data to the NVSM that was previously stored in the VM but not replicated while operating in the primary power on mode; and wherein the NVSM can be decoupled from the controller and other components of the SSD while the controller is operating in either the primary power on mode or the primary power off mode.

* * * * *